(12) United States Patent
Dunn et al.

(10) Patent No.: US 10,640,237 B2
(45) Date of Patent: May 5, 2020

(54) SPACECRAFT HAVING ELECTRONIC COMPONENTS AS STRUCTURAL MEMBERS AND RELATED METHODS

(71) Applicant: Made In Space, Inc., Moffett Field, CA (US)

(72) Inventors: Jason Dunn, Mountain View, CA (US); Michael Snyder, Mountain View, CA (US)

(73) Assignee: MADE IN SPACE, INC., Moffett Field, CA (US)

( * ) Notice: Subject to any disclaimer, the term of this patent is extended or adjusted under 35 U.S.C. 154(b) by 861 days.

(21) Appl. No.: 14/596,999

(22) Filed: Jan. 14, 2015

(65) Prior Publication Data
US 2015/0210408 A1    Jul. 30, 2015

Related U.S. Application Data

(60) Provisional application No. 61/927,435, filed on Jan. 14, 2014.

(51) Int. Cl.
*B64G 1/10*    (2006.01)
*B33Y 80/00*    (2015.01)
*B64G 1/00*    (2006.01)
*B64G 99/00*    (2009.01)

(52) U.S. Cl.
CPC ............... *B64G 1/10* (2013.01); *B33Y 80/00* (2014.12); *B64G 1/002* (2013.01); *B64G 9/00* (2013.01); *B64G 2001/1092* (2013.01); *Y10T 29/49002* (2015.01); *Y10T 29/49826* (2015.01)

(58) Field of Classification Search
CPC .. B64G 1/10; B64G 2001/1092; B33Y 80/00; Y02T 29/4982
See application file for complete search history.

(56) References Cited

U.S. PATENT DOCUMENTS 5,310,141 A * 5/1994 Homer ................... B64G 1/425
136/222
5,351,746 A * 10/1994 Mackey ................. B64G 1/503
165/104.14

(Continued)

OTHER PUBLICATIONS

Bhavya Lal, The Promises and Perils of Space-Based Additive Manufacturing, Dec. 1, 2014, The Space Review (http://www.thespacereview.com/article/2654/1).*

(Continued)

*Primary Examiner* — Brian M O'Hara
*Assistant Examiner* — Keith L Dixon
(74) *Attorney, Agent, or Firm* — Terry M. Sanks, Esq.; Beusse Wolter Sanks & Maier, PLLC (57) ABSTRACT

A method is provided for partially or completely manufacturing a spacecraft in an extraterrestrial environment, thereby allowing the spacecraft to be transported from Earth in a form that is better able to withstand forces associated with a rocket launch and traversing Earth's atmosphere. Such a form may allow the spacecraft to be significantly smaller than it would need to be if it had to be in a completed form at the time of transportation. Two forms of spacecraft that may be built by such method are also disclosed. In an aspect, the disclosed devices may be configured to be manufactured, assembled, deployed, and utilized in a timely and efficient manner.

11 Claims, 11 Drawing Sheets

(56) References Cited

U.S. PATENT DOCUMENTS

| | | | | |
|---|---|---|---|---|
| 5,787,671 | A * | 8/1998 | Meguro | B64G 1/222 |
| | | | | 52/646 |
| 7,710,348 | B2 * | 5/2010 | Taylor | H01Q 1/08 |
| | | | | 29/600 |
| 8,384,613 | B1 * | 2/2013 | Murphey | H01Q 15/161 |
| | | | | 343/880 |
| 8,963,135 | B2 * | 2/2015 | Nikonov | H01L 51/0004 |
| | | | | 257/40 |
| 9,186,828 | B2 * | 11/2015 | Guterman | B29C 33/76 |
| 2005/0251275 | A1 * | 11/2005 | Carlson | G05B 19/4097 |
| | | | | 700/98 |
| 2006/0111807 | A1 * | 5/2006 | Gothait | B29C 67/0088 |
| | | | | 700/119 |
| 2014/0152510 | A1 * | 6/2014 | Manry, Jr. | H01Q 21/061 |
| | | | | 343/700 MS |

OTHER PUBLICATIONS

Effects of Micrgravity on Extrusion based Additive Manufacturing, Oct. 12, 2013 (https://arc.aiaa.org/doi/pdf/10.2514/6.2013-5439).*

Transforming Spacecraft Economics Via on Orbit Assembly, Jan. 30, 2002 (http://www.spacedaily.com/news/satellite-tech-02a.html).*

Developing Fabrication Technologies to Provide on Demand Manufacturing for Exploration of the Moon and Mars, Jan. 9, 2006, (https://arc.aiaa.org/doi/pdf/10.2514/6.2006-526).*

\* cited by examiner

SPACECRAFT HAVING ELECTRONIC COMPONENTS AS STRUCTURAL MEMBERS AND RELATED METHODS

CROSS REFERENCE TO RELATED APPLICATION

This application claims the benefit of U.S. Provisional Patent Application Ser. No. 61/927,435, filed Jan. 14, 2014, and entitled "Spacecraft Having Electronic Components As Structural Members And Related Methods," the entire contents of which are incorporated herein by reference.

FIELD OF THE DISCLOSURE

The present disclosure generally relates to spacecraft such as satellites, and more particularly to apparatus, systems and methods for producing and deploying satellites in space.

BACKGROUND

Satellite design is constrained by the harsh environment of launch. Launch vehicles such the Atlas V® vehicle (available from United Launch Alliance, LLC of Centennial, Colo.), the Falcon 9 vehicle (available from Space Exploration Technologies, Inc. of Hawthorne, Calif.) and the Space Shuttle (formerly operated by the National Aeronautics and Space Administration) subject payloads to intense static loads, shock loads, g-forces, acoustic loads, and vibration modes, among others. Forces acting on a satellite or other spacecraft may vary from 1 g before liftoff to, in the case of the Falcon 9 vehicle or the Atlas V vehicle, 5 g's during flight. Solid rocket vehicles, such as the Minotaur rocket (available from Orbital Sciences Corporation of Dulles, Va.) subject payloads to accelerations as high as 13 g's during nominal flight. Most payloads delivered by such vehicles operate in the microgravity environment of Earth orbit. There, these satellites experience accelerations on the order of $10^{-6}$ gravities and are not subjected to significant vibrational or acoustic loads. A satellite may comprise station keeping thrusters or an in space propulsion system, however these systems typically do not subject the satellite to accelerations greater than 1 g.

Although a satellite endures launch forces for only a fraction of its total operational life, the satellite must be designed to survive this environment, leading to a vehicle that is "over built" for in space operations. A satellite typically comprises a bus or a frame configured to contain the systems of the satellite and protect such systems during launch. The frame is typically constructed of high strength metal or composites. Connections between systems and the systems themselves must be hardened against launch conditions. While the robustness of the satellite bus, satellite systems, and connections between such systems ensures that the satellite survives launch and arrives in its operating orbit intact and functioning, this robust construction serves little purpose thereafter. In fact, satellite mass and volume are wasted and the design of the satellite itself causes it to be larger than necessary to support the vehicle in its operating environment. Among other things, mass is wasted which could otherwise be devoted to launching additional instruments, sensors, supplies, and the like.

Inflatable spacecraft, such as the Genesis I space habitat (build by Bigelow Aerospace, LLC of Las Vegas, Nev.), have been designed in order to increase in space utility of spacecraft. An inflatable spacecraft comprises one or more bladders which are stored in a collapsed configuration during launch, thereby minimizing the volume occupied and more readily absorbing and withstanding launch-related forces. Upon reaching orbit, the bladder is expanded, creating a structure such as a habitat, an antenna, or the like. Some inflatable structures can support themselves in space but could not exist on Earth or when subjected to significant accelerations.

Development and deployment of satellites and other spacecraft is currently a lengthy an intricate process. Each component of a satellite is generally uniquely adapted to the mission of the satellite. The design and construction cycle of a satellite is typically measured in terms of years. The introduction of modular form factors such as the CubeSat form factor (originally developed at California Polytechnic State University (Cal-Poly) and Stanford University) and the ChipSat design provide uniformity, thereby helping reduce development times and cost. The CubeSat form factor is based on 10×10×10 cm "units." CubeSats are typically launched and deployed from a mechanism called a Poly-Picosatellite Orbital Deployer (P-POD), developed by Cal-Poly. P-PODs are mounted to a launch vehicle and carry CubeSats into orbit and deploy them from the launch vehicle. The P-POD Mk III has capacity for three 1U CubeSats. Since three 1U CubeSats are exactly the same size as one 3U CubeSat, and two 1U CubeSats are the same size as one 2U CubeSat, the P-POD can deploy 1U, 2U, or 3U CubeSats in any combination up to a maximum volume of 3U, thereby simplifying in-space deployment of CubeSats.

Even where off the shelf computing and sensors are used, deploying a satellite can take a significant amount of time because the available launches are expensive, infrequent, and often significantly delayed.

Given the foregoing, apparatus, systems, and methods are needed which enable in space production and utilization of satellites. Additionally, apparatus, systems and methods are needed which facilitate the rapid production and deployment of satellites and other spacecraft.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

Aspects of the present disclosure meet the above-identified needs by providing apparatus, systems, and methods which enable production of satellites and other spacecraft having a support structure adapted for deployment and operation in space. Such support structures may be configured to function in space without being constrained by the need to survive the conditions of launch. Satellites with such a support structure may be produced in space from components produced in space, components produced on Earth or another celestial body, or a combination thereof.

In an aspect, electronic components are integrated into a support structure which has been produced in space. The support structure may be produced by an additive manufacturing device adapted for use in space.

In an aspect, a plurality of microsatellites, such as a ChipSat, are integrated into support structures. Each support structure holds two microsatellites and is configured to stack and/or physically interconnect with additional support structures at the front and rear of the support structure. The support structures are configured to be deployed from a P-POD launcher and enable the deployment of a dozen distinct ChipSats in the volume of a 1U CubeSat. The support structure may be assembled from four pieces produced via two prints from an additive manufacturing device.

Aspects of the present disclosure provide spacecraft and methods of producing spacecraft wherein electronic components, sensors, or other functional portions of the spacecraft form at least a portion of the structure of the spacecraft. Circuit boards may be interconnected, forming walls of the spacecraft. Spacecraft having such components as portions of the physical structure may be constructed and deployed in space. In some aspects, the spacecraft is assembled in a manner which would not survive launch from a celestial body, such as Earth, or would endanger other payloads being launched.

In an aspect, a 1U CubeSat, comprises six 10×10 cm circuit boards and four support structures. The circuit boards are joined together via the support structures, thereby forming a 1U CubeSat having circuit boards as structural members. The support structures may be created by an additive manufacturing device on Earth or in space. The support structures may be created via a single print of the additive manufacturing device. Upon completion, the circuit boards and the support structures may be assembled into the CubeSat within a spacecraft (e.g., the International Space Station) and launched from the spacecraft.

In an aspect, a spacecraft support structure may be produced utilizing shape memory materials. This structure may be produced via additive manufacturing methods or traditional methods. The support structure is initially configured as a two dimensional shape. Upon exposure to a stimulus such as the high radiation environment of space, the two-dimensional shape may fold or otherwise move into a desired three-dimensional shape. Functional components (e.g., circuit boards, sensors, solar cells, and the like) may be connected to the support structure when the support structure is in a two-dimensional form or when it is in a three-dimensional form.

In an aspect, a satellite or other spacecraft may be additively manufactured in its entirety with electronic components placed and embedded within the structure itself. Using an additive manufacturing process, conductive traces may be printed into the structure during the manufacturing process, with electronic components attached robotically or manually in order to connect to the conductive traces and to the structure. In this manner, a satellite may be produced having no types of nuts, bolts, cables, wires, or other fastener. The satellite is a solid structure with a non-homogenous set of materials that together functions in the specified manner.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

The present disclosure is directed to apparatus, systems and methods which enable production of satellites and other spacecraft having a support structure adapted for deployment and operation in space. Aspects of the present disclosure provide spacecraft which can be manufactured at least in part by additive manufacturing devices. Furthermore, aspects of the present disclosure provide spacecraft having functional components such as circuit boards that function as structural supports.

Figure 1:
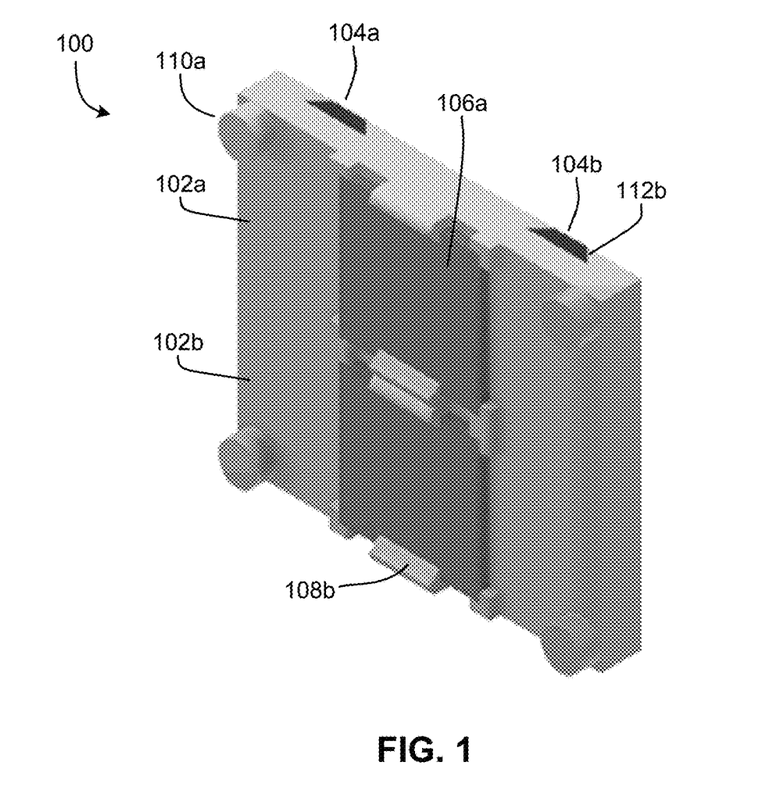
FIG. 1 is an image of a support apparatus containing two microsatellites, according to an aspect of the present disclosure.

Referring now to FIG. 1, an image of a support apparatus 100 containing two microsatellites 106 (labelled, for clarity, only as microsatellites 106a in FIG. 1), according to an aspect of the present disclosure, is shown. In some aspects, microsatellites 106 may comprise other types of circuit boards.

Figure 2:
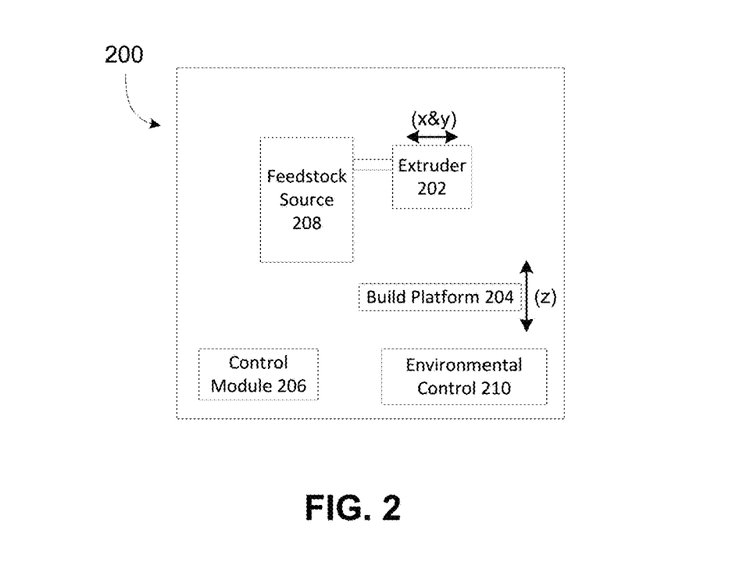
FIG. 2 is a block diagram of an exemplary additive manufacturing device, according to an aspect of the present disclosure.

A spacecraft may consist solely of support apparatus 100 and one or more microsatellites. Support apparatus 100 may be constructed in space or on Earth. In another aspect, a spacecraft may comprise support apparatus 100, one or more microsatellites and other elements such as a thruster, additional support apparatus 100 (see FIGS. 5-6), and the like. Support apparatus 100 may be constructed by an additive manufacturing device, as shown in FIG. 2 and discussed in more detail below. Support apparatus 100 may be constructed in orbit (e.g., aboard a space habitat or an orbiting vehicle), thereby allowing the device pictured in FIG. 1 to be launched from Earth in a form which more readily withstands a launch environment. For example, support apparatus 100 may be constructed from a thermoplastic, such as PLA or ABS. A spool of thermoplastic may be launched into orbit via a launch vehicle such as the Atlas V vehicle. Upon reaching orbit, the spool may be converted to support apparatus 100 via an in-space additive manufacturing device. Circuit boards, satellites on a chip, or other components may be delivered to orbit in a similar fashion and integrated into support apparatus 100. In this manner, the elements which make up the device pictured in FIG. 1 or other satellites and spacecraft may be launched in an arrangement which withstands launch forces more readily, enables more efficient storage and packaging in constrained environments and provides other benefits apparent to those skilled in the relevant art(s) after reading the description herein.

In an aspect, the device of FIG. 1 may be assembled and launched in space. In an aspect, microsatellite 106 is a structural member of the device, reinforcing the structure in concert with support apparatus 100.

Support apparatus 100 is a rigid member and may be constructed of thermoplastic, metal, composite material or another material apparent to those skilled in the relevant art after reading the description herein. Support apparatus 100 may be configured to support one or more microsatellites 106 or other functional components (e.g., sensors, solar cells, and the like). In an aspect, such functional components also serve as structural members.

Figure 7:
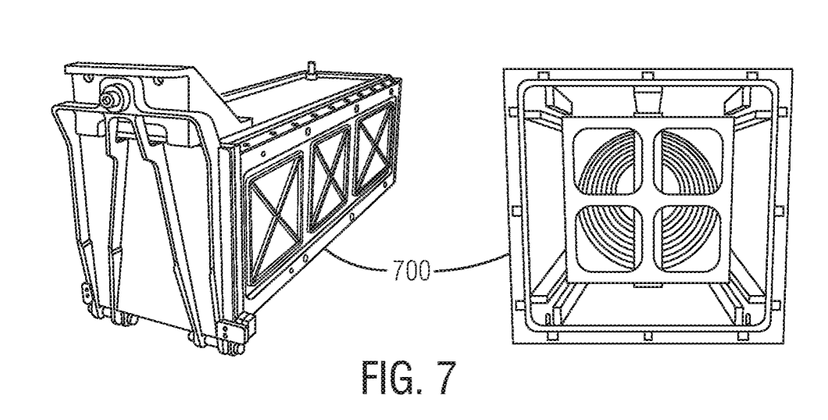
FIG. 7 is an image of various views of a P-POD, according to an aspect of the present disclosure.

In an aspect, support apparatus 100 comprises an upper frame 102a and a lower frame 102b. Frame 102 comprises socket 108 (labeled, for clarity, only as socket 108b in FIG. 1), stand 110 (labeled, for clarity, only as stand 110a in FIG. 1), and channels 112 (labeled, for clarity, only as channel 112b in FIG. 1). Support apparatus 100 may be ten centimeters tall, ten centimeters across, and one to two centimeters deep. Such dimensions enable utilization of devices designed for CubeSats, such as the P-POD (see FIG. 7). In various aspects, support apparatus, spacecraft and/or satellites disclosed herein are configured to be deployed via small satellite launchers such as P-PODs. In other aspects, larger objects are created and deployed via other in-space launchers or other methods apparent to those skilled in the relevant art(s) after reading the description herein.

Socket 108 is configured to retain microsatellite 106. Stand 110 enables stacking of multiple support apparatus 100 without damaging components integrated into support apparatus 100. Channel 112 is configured to receive crossmember 104 (labeled as crossmembers 104a-b in FIG. 1), thereby joining upper frame 102a and lower frame 102b.

Microsatellite 106 and other components may be integrated into support apparatus 100 via fasteners such as screws, glue, clips and the like.

In an aspect, frames 102 may comprise electrical connections, thereby enabling components on each frame such as microsatellite 106 to be interconnected for the transfer of data, power, and the like.

Referring now to FIG. 2, a block diagram of an exemplary additive manufacturing device 200, according to an aspect of the present disclosure, is shown.

Additive manufacturing device 200 comprises an extruder 202 positionable in two axes (e.g., x and y axes). Additive manufacturing device 200 may be a fused deposition-type device or any other additive manufacturing device apparent to those skilled in the relevant art after reading the description herein, including but not limited to a stereolithographic device, an electron beam freeform fabrication device, and a selective laser sintering device.

Figure 10:
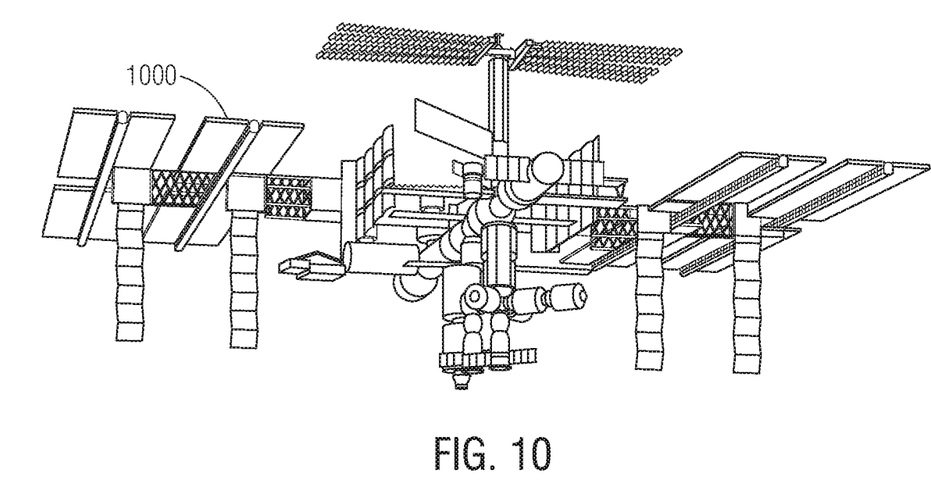
FIG. 10 is an image of a space habitat where spacecraft in accordance with the present disclosure may be assembled and launched, according to an aspect of the present disclosure.
Figure 11:
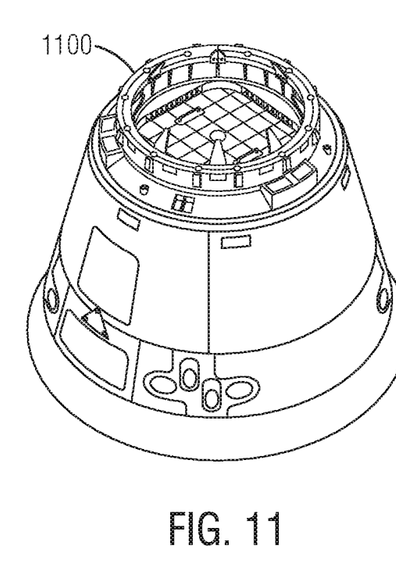
FIG. 11 is an image of a vehicle where spacecraft in accordance with the present disclosure may be assembled and launched, according to an aspect of the present disclosure.

Additive manufacturing device 200 may be located on Earth, on another celestial body, in space, or aboard a space habitat 1000 (as shown in FIG. 10) or on a spacecraft 1100 (as shown in FIG. 11).

Additive manufacturing device 200 further comprises a build platform 204 positionable in a third axis (e.g., the z-axis). Build platform 204 is configured to support parts as they are being constructed. In another aspect, build platform 204 is omitted. Build platform 204 is a support which holds another part, thereby enabling additive manufacturing device 200 to add additional portions (i.e., layers) to the part being held. Actuators (not shown) are attached to extruder 202 and build platform 204. In an aspect, additive manufacturing device 200 comprises one actuator for each axis.

Extruder 202 is adapted to create a desired part on build platform 204 via deposition of a polymer or other material. Deposition may be done in an additive manner, such as a layer-wise or raster pattern. The positions of extruder 202 and build platform 204 during construction may be controlled by a build control module 206, electrically connected to each actuator. Build control module 206 may be software, hardware, or a combination of software and hardware. Build control module 206 is configured to cause the desired part (e.g., a support structure) to be produced by additive manufacturing device 200.

Extruder 202 is connected to a feedstock source 208. Feedstock source 208 houses and supplies material necessary to produce one or more parts via additive manufacturing device 200. In an aspect, feedstock source 208 is a spool of polymer filament threaded into extruder 202. Extruder 202 is configured to heat the polymer filament to its melting point and deposit the melted polymer in order to form the desired part.

Environmental control 210 is configured to regulate the environment of additive manufacturing device 200. In an aspect, environmental control 210 is comprises at least one fan, a temperature regulation device (e.g., a heater, an air conditioning unit), and a filter. Environmental control 210 regulates one or more of: temperature, humidity, and air quality within additive manufacturing device 200, thereby preventing outgassing and contamination of the environment in which additive manufacturing device 200 is located during operation.

In various aspects, additive manufacturing device 200 includes multiple material extruders 202. Extruder 202 may be configured to place multiple materials during a single build. Both a multi-extruder device 200 and device 200 having extruder 202 capable of placing multiple materials during a single build may be used to create support apparatus 100 and other portions of spacecraft or components thereof having multiple materials. For example, conductive material may be built into parts created by device 200. In this manner, support apparatus 100 may include conductive traces, lines, wires, circuits or the like. Such conductive elements may connect other portions of a satellite, spacecraft, portion thereof or the like. In some aspects, support apparatus 100 contains conductive elements which interconnect electrical components placed in support apparatus 100, allowing an additively manufactured support structure, frame or the like to also serve as an electrical connection or wire harness. In other aspects, conductive elements may be additively manufactured (either within a polymer part or outside the part) in a form of an antenna or other functional component. Where support apparatus 100 and electrical components may be assembled without tools, (e.g., such components snap fit together), objects may be assembled and electrical components connected simply by assembling the device. In yet other aspects, wires or electrical structures may be embedded in objects additively manufactured by device 200 in an extraterrestrial environment.

As will be apparent to those skilled in the relevant art(s) after reading the description herein, additive manufacturing devices of other configurations than that depicted in FIG. 2 may be utilized herein. Additive manufacturing device 200 may be configured according to the disclosures of U.S. patent application Ser. No. 14/331,729, entitled "Manufacturing in Microgravity and Varying External Force Environments", filed on Jul. 15, 2014 by the Applicant and incorporated herein in its entirety. Additive manufacturing device 200 may be configured according to the disclosures of U.S. patent application Ser. No. 14/485,240, entitled "Additive Manufacturing Of Extended Structures", filed on Sep. 12, 2014 by the Applicant and incorporated herein in its entirety. Multiple additive manufacturing devices configured as required by the portion of the object being created may be used.

Figure 3:
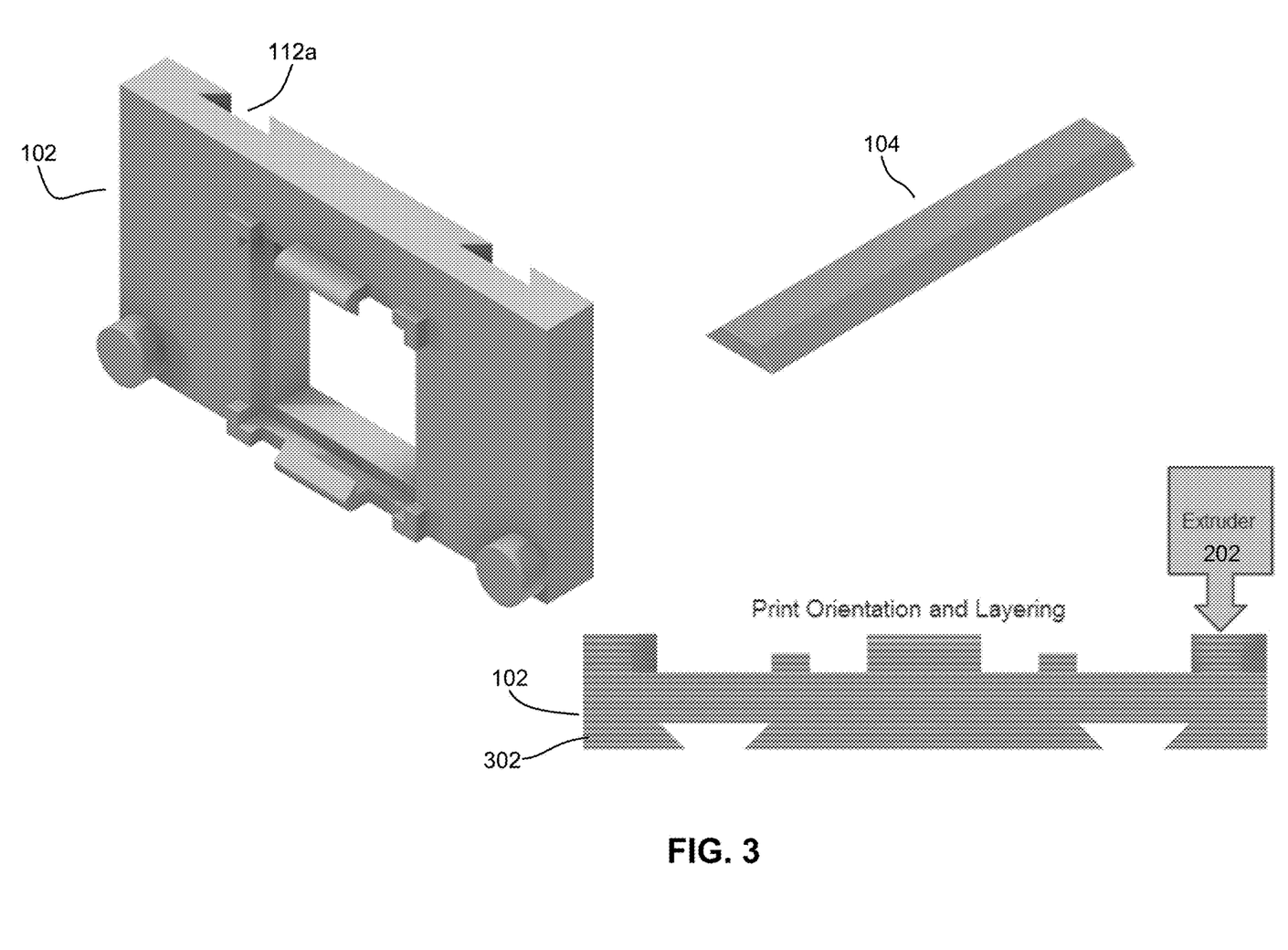
FIG. 3 is an image of portions of a support apparatus configured to contain two microsatellites, including a representative print orientation and layering, according to an aspect of the present disclosure.

Referring now to FIG. 3, an image of portions of support apparatus 100 configured to contain two microsatellites 106, including a representative print orientation and layering, according to an aspect of the present disclosure, is shown.

In an aspect, frame 102 and crossmember 104 are produced via one print of an additive manufacturing device 200. As shown in FIG. 3, frame 102 may be created in layers 302, each layer 302 being created by deposition from extruder 202.

Figure 4:
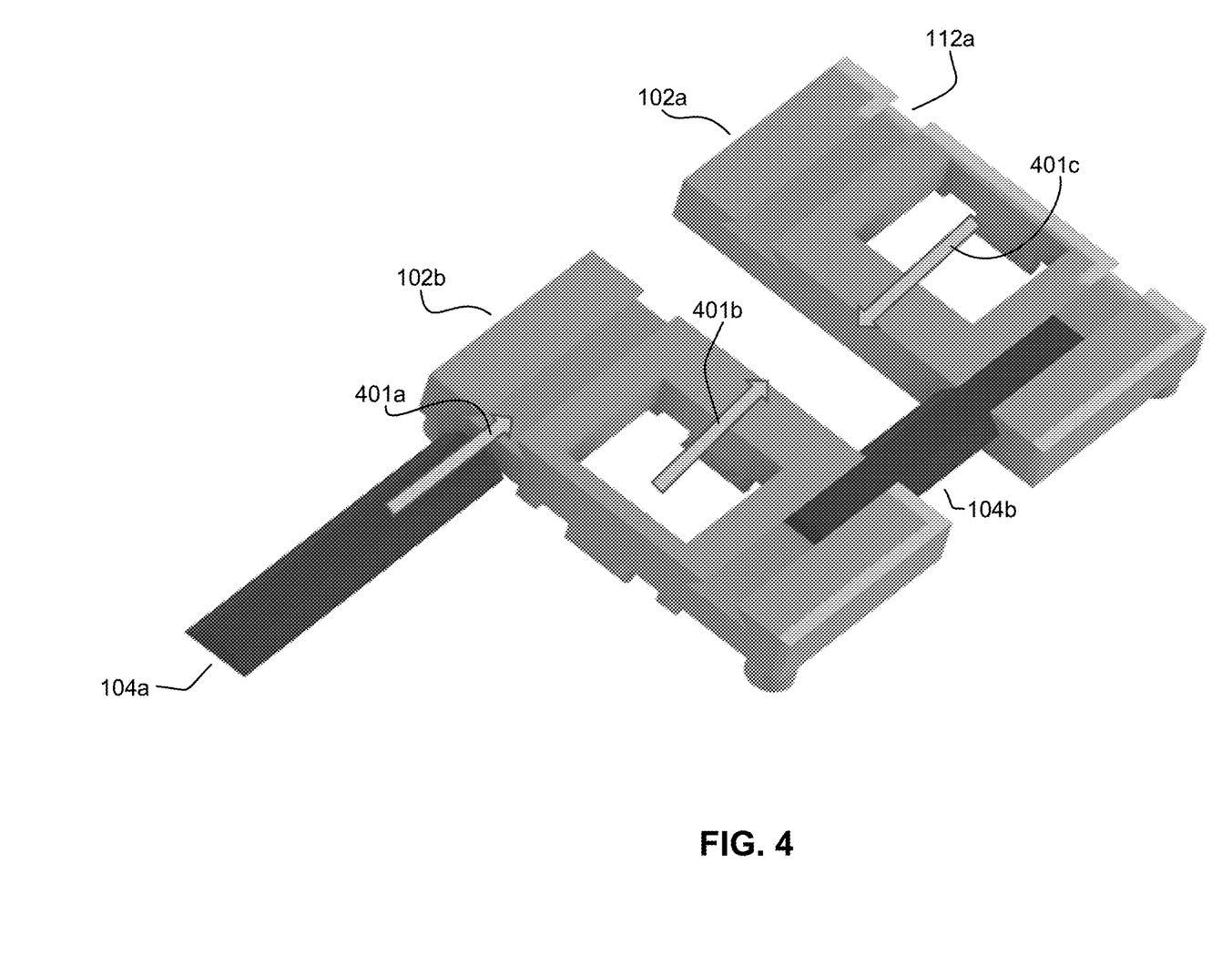
FIG. 4 is an image of assembling a support apparatus configured to contain two microsatellites, according to an aspect of the present disclosure.

Referring now to FIG. 4, an image of assembling support apparatus 100 configured to contain two microsatellites 106, according to an aspect of the present disclosure, is shown.

Support apparatus 100 is created by joining upper frame 102a and lower frame 102b. As shown by arrows 401a-c, upper frame 102a and lower frame 102b may be joined by inserting crossmembers 104 into channels 112. Upon assembly of support apparatus 100, microsatellites 106 may be inserted into sockets 108 and the assembled device may be deployed in space.

Figure 5:
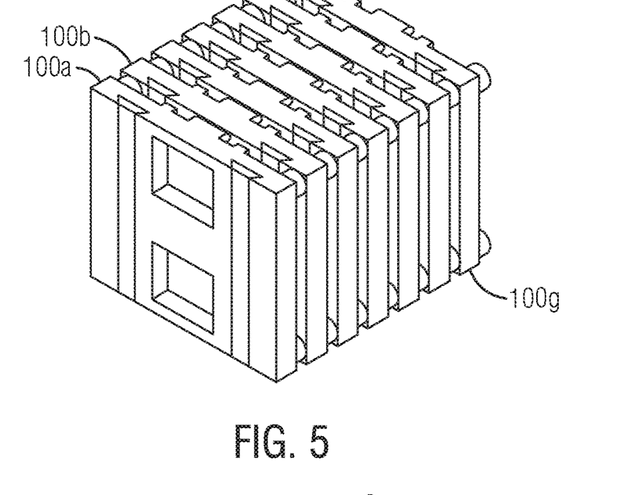
FIG. 5 is an image of a plurality of support apparatus stacked together in a manner that enables the spacecraft to be loaded into a P-POD, according to an aspect of the present disclosure.

Referring now to FIG. 5, an image of a plurality of support apparatus 100 (labeled, for clarity only as support apparatus 100a, 100b, and 100g in FIG. 5) stacked together in a manner that enables loading into a P-POD 700, according to an aspect of the present disclosure, is shown.

Figure 6:
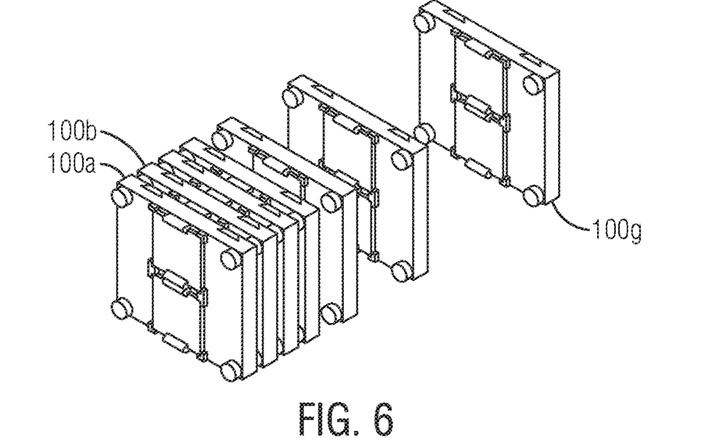
FIG. 6 is an image showing a plurality of support apparatus separating, according to an aspect of the present disclosure.

Support apparatus 100 may be between 1/10 and 1/7 the thickness of a 1U CubeSat and the same width and height of a 1U CubeSat. These dimensions enable a plurality of support apparatus 100 to be launched from devices adapted for use with CubeSats, such as a P-POD 700 (see FIG. 7). In an aspect, support apparatus 100 containing microsatellites are stacked and placed with P-POD. As shown in FIG. 6, upon launching, support apparatus 100 separate from one another, causing multiple satellites to be deployed.

In an aspect, stands 110 removably join support apparatus 100 together via physical connection. In another aspect, stands 110 separate each support apparatus 100 from the next, protecting microsatellite 106 and enabling support apparatus 100 to separate freely upon deployment.

Figure 8A:
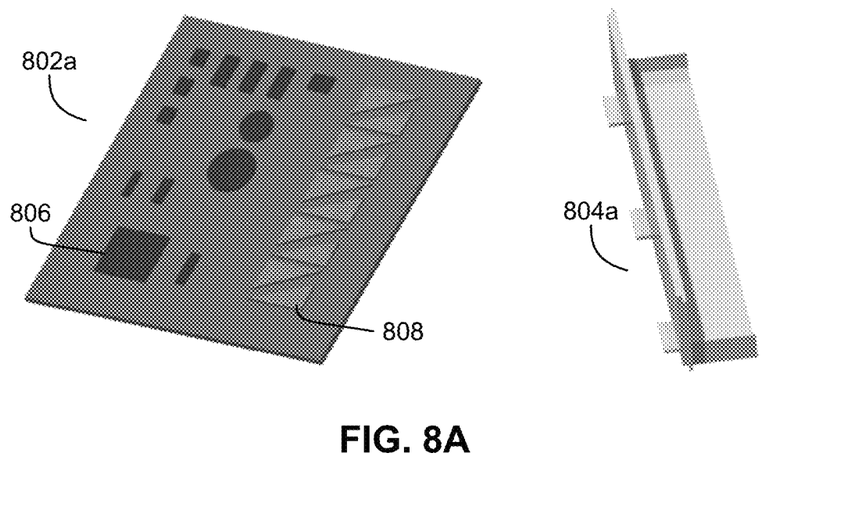
FIGS. 8A-B are images of a spacecraft having structural portions constructed from circuit boards and various elements that make up the spacecraft, according to an aspect of the present disclosure.
Figure 8B:
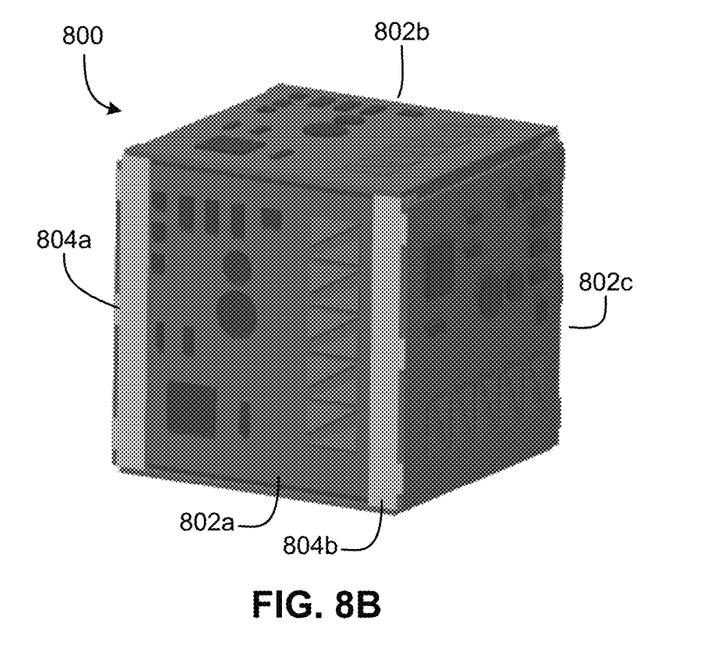

Referring now to FIGS. 8A-B, images of a spacecraft 800 having structural portions 802 (labelled, for clarity, only as portions 802a-c in FIGS. 8A-B) constructed from circuit boards and various components that make up spacecraft 800, according to an aspect of the present disclosure, are shown.

Current spacecraft rely on metallic or composite structure to comprise the spacecraft shape. Electronics and other functional components are merely housed separately and connected to the spacecraft structure.

Where in-space manufacturing is utilized, launch loads are not a driving constraint for design. This enables the elimination of most structural elements. In the case of small satellites (e.g., CubeSats) circuit boards or other functional elements may themselves provide enough structural support to maintain the shape and size of the spacecraft. In larger spacecraft, the same principal applies. In such aspects, much of the volume of the spacecraft may be freed up due to repositioning of functional elements such as circuit boards for the purpose of structural support.

In an aspect, structural portions 802 (labeled, for clarity, only as structural portions 802a-c in FIG. 8) are circuit boards and function as the primary structural element of spacecraft 800. Spacecraft 800 further comprises secondary members 804 (labeled, for clarity, only as secondary members 804a-b in FIG. 8) which join structural portions 802 together, forming spacecraft 800. In an aspect, spacecraft 800 has a cube structure measuring 10 centimeters per side. As will be apparent to those skilled in the relevant art(s) after reading the description herein, in another aspect, spacecraft 800 may be a rectangle, a plate, an octahedron, or another configuration dictated by the mission parameters or spacecraft designers.

Structural portions 802 may comprise functional elements such as processor 806, solar cells 808, and the like. The interior of spacecraft 800 may be hollow or contain additional functional elements (e.g., a reaction wheel, a power source, power and data connections, and the like).

Secondary members 804 may be constructed on Earth or another celestial body or in space. An additive manufacturing device such as device 200 may be utilized. In an aspect, spacecraft 800 comprises four secondary members 804. All four secondary members 804 may be simultaneously printed. Where structural portions 802 are on hand, printing of secondary members 804 and assembly of spacecraft 800 may occur in hours, thereby enabling rapid deployment of a customized satellite.

Secondary member 804 may be configured to snap onto structural portions 802, enabling the assembly of spacecraft 800 without additional parts, tools, or mounting hardware. In another aspect, structural portions 802 are fastened to secondary member 804 via glue, screws, or the like.

In an aspect, a spacecraft support structure such as secondary member 804 or frame 102 may be produced utilizing shape memory materials. This structure may be produced via additive manufacturing methods or traditional methods. The support structure is initially configured as a two dimensional shape. Upon exposure to a stimulus such as the high radiation environment of space, the two-dimensional shape may fold or otherwise move into a desired three-dimensional shape. Functional components (e.g., circuit boards, sensors, solar cells, and the like) may be connected to the support structure when the support structure is in a two-dimensional form or when it is in a three-dimensional form.

Figure 9:
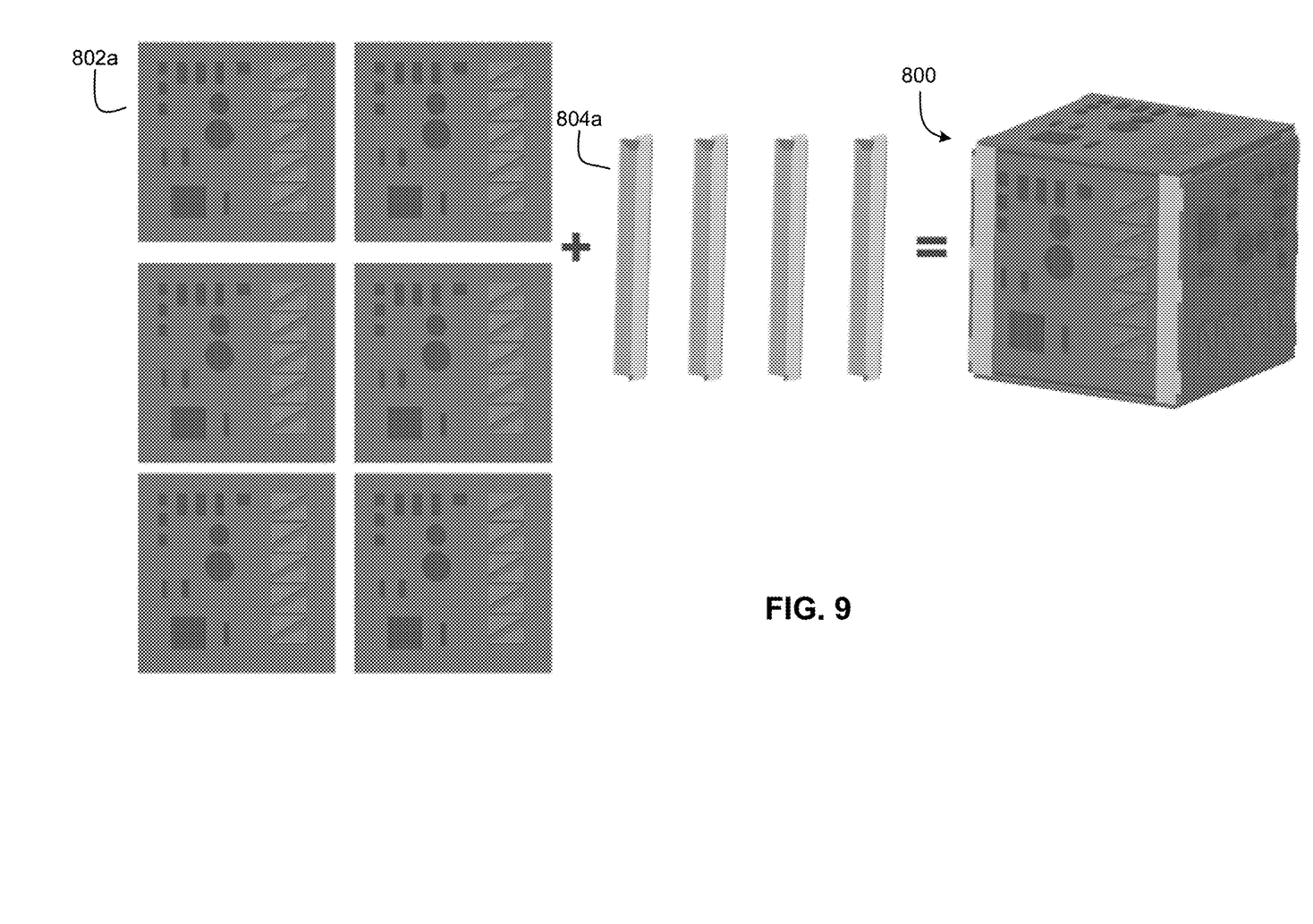
FIG. 9 is an image showing the components necessary to assemble a spacecraft having sides constructed from circuit boards, according to an aspect of the present disclosure.

Referring now to FIG. 9, an image showing the components necessary to assemble spacecraft 800 having sides constructed from circuit boards, according to an aspect of the present disclosure, is shown.

In various aspects, the present disclosure may be utilized to produce spacecraft 800 on Earth. That is, this disclosure is not limited to merely producing spacecraft in space.

Assembly of spacecraft 800 requires six structural portions 802 and four secondary members 804. In an aspect, all structural portions 802 are functional components having sensors, processors, and the like. In another aspect, one or more structural components are blanks. That is, they are simply plates or other pieces which give spacecraft 800 structure but do not otherwise function. In yet another aspect, at least one structural portion 802 is omitted, creating a cube with at least one open face.

Referring briefly to FIGS. 10-11, images of a space habitat 1000 and a vehicle 1100 where spacecraft in accordance with the present disclosure (e.g., spacecraft 800, the device pictured in FIG. 1) may be assembled and launched, according to an aspect of the present disclosure, are shown.

Figure 12:
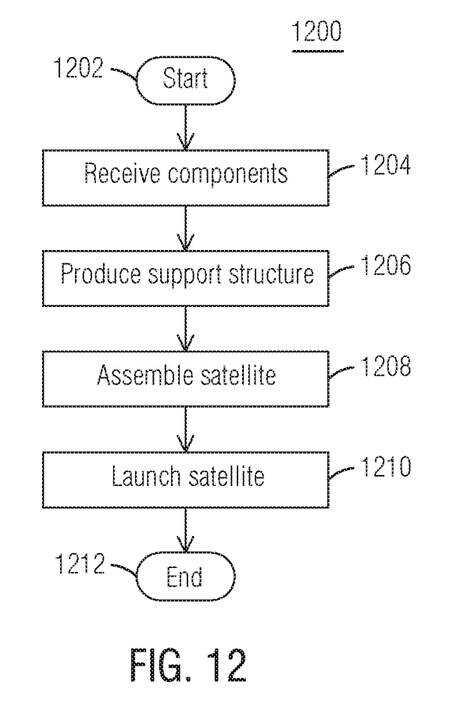
FIG. 12 is a flowchart depicting an exemplary process for assembling and launching spacecraft, according to an aspect of the present disclosure.

Referring now to FIG. 12, a flowchart depicting an exemplary process for assembling and launching spacecraft, according to an aspect of the present disclosure, is shown.

In an aspect, satellites such as spacecraft 800 or the device pictured in FIG. 1 are created in space on demand. Some portions, such as structural portion 802, are created on Earth or another celestial body and delivered to a location in space such as space habitat 1000 or vehicle 1100. Other components are made on site. Circuitry in structural portion 802 may be programmable, enabling the creation of a customized satellite on demand and rapid launch from the construction location.

In another aspect, the present disclosure may utilize additive manufacturing techniques to produce a spacecraft such as a satellite in space whereby components of the spacecraft or the entire spacecraft are manufactured in-situ. That is, process 1200 or other aspects of the present disclosure may be utilized to produce a spacecraft in orbit by producing portions of the spacecraft via additive manufacturing. The design of the spacecraft may be received at the in orbit production site from Earth or produced in space as well. In another aspect, other manufacturing methods are used.

Production and assembly of spacecraft in orbit, particularly using additive manufacturing to produce portions of the spacecraft in orbit, enables the craft to be built without considering withstanding launch forces, thereby enabling a broader range of structures and configurations of the spacecraft.

Process 1200, at least a portion of which may be executed in a microgravity environment such as Earth orbit, facilitates the creation and launch of a spacecraft having functional structural components, begins at step 1202 with control immediately passing to step 1204.

At step 1204, components are received at the assembly location. The assembly location may be a vehicle 1100 in orbit or an orbiting space habitat 1000. In an aspect, functional components such as circuit boards are launched into orbit and received at the assembly location At step 1206, a support structure is produced. In an aspect, the support structure is support apparatus 100 or secondary members 804. Such support structures may be produced at the assembly location by additive manufacturing device 200 or the like or on Earth and subsequently transported to the assembly location.

At step 1208, a satellite or other spacecraft is assembled in the microgravity environment of the assembly location, thereby enabling the creation of a satellite with a structure unconstrained by launch environment considerations.

At step 1210, the assembled satellite is launched. Launch may occur via manual deployment, deployment via P-POD 700 or in another manner apparent to those skilled in the relevant art(s) after reading the description herein.

Process 1200 then terminates at step 1212.

In another aspect, a satellite, a spacecraft, or a portion thereof, may be constructed where in the support structure and at least some of the electrical components (e.g., wire traces, PCB traces) are constructed via additive manufacturing. Other components (e.g., power generation modules, processors, remote sensing equipment) may be embedded at desired locations. Embedding of other components may be manual or robotically carried out. Additional structure, such as retaining members, may then be added to the satellite via additive manufacturing. These steps may be repeated until the satellite or a desired portion of a satellite is complete. In this manner, a satellite may be produced having no types of nuts, bolts, cables, wires, or other fastener. The satellite is a solid structure with a non-homogenous set of materials that together functions in the specified manner. Such a process may be carried out on Earth or in space.

Figure 13:
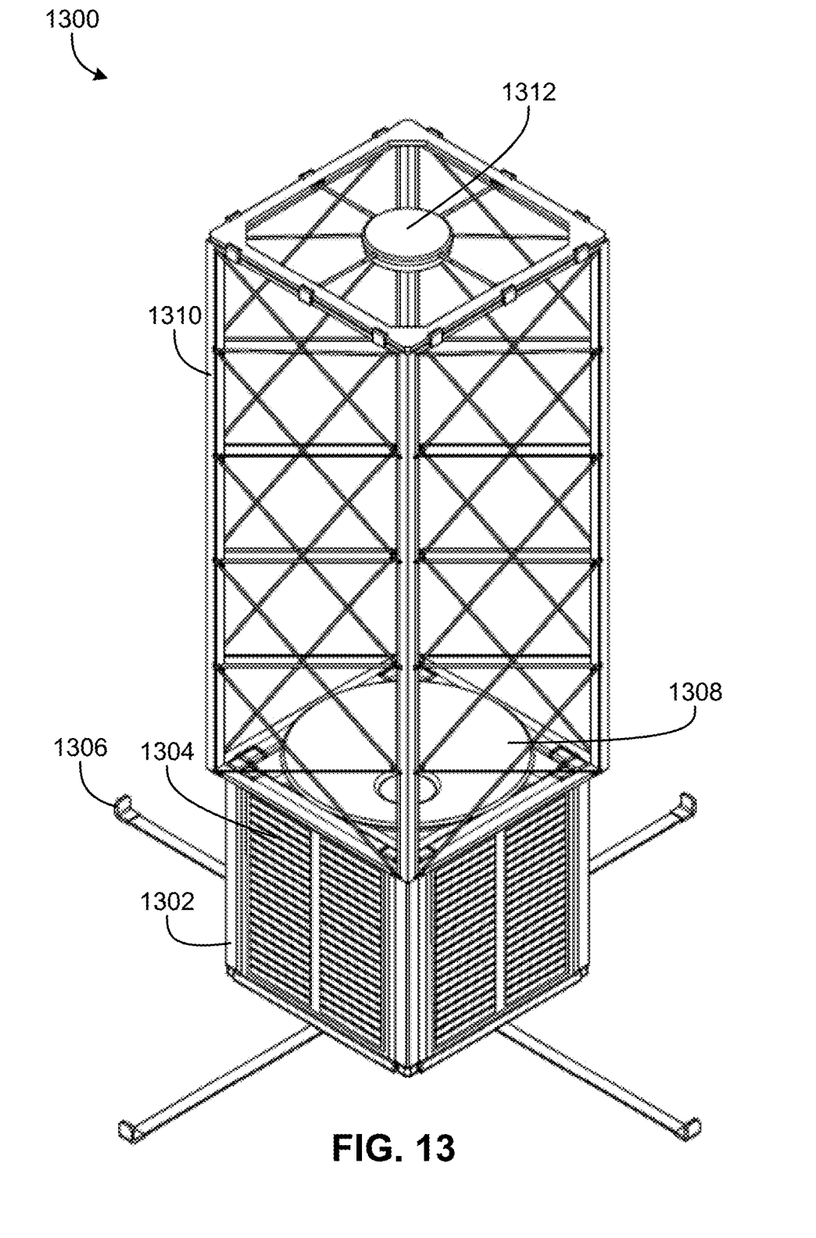
FIG. 13 is a perspective view of an observation satellite having a reflector support structure produced by additive manufacturing, according to an aspect of the present disclosure.
Figure 14:
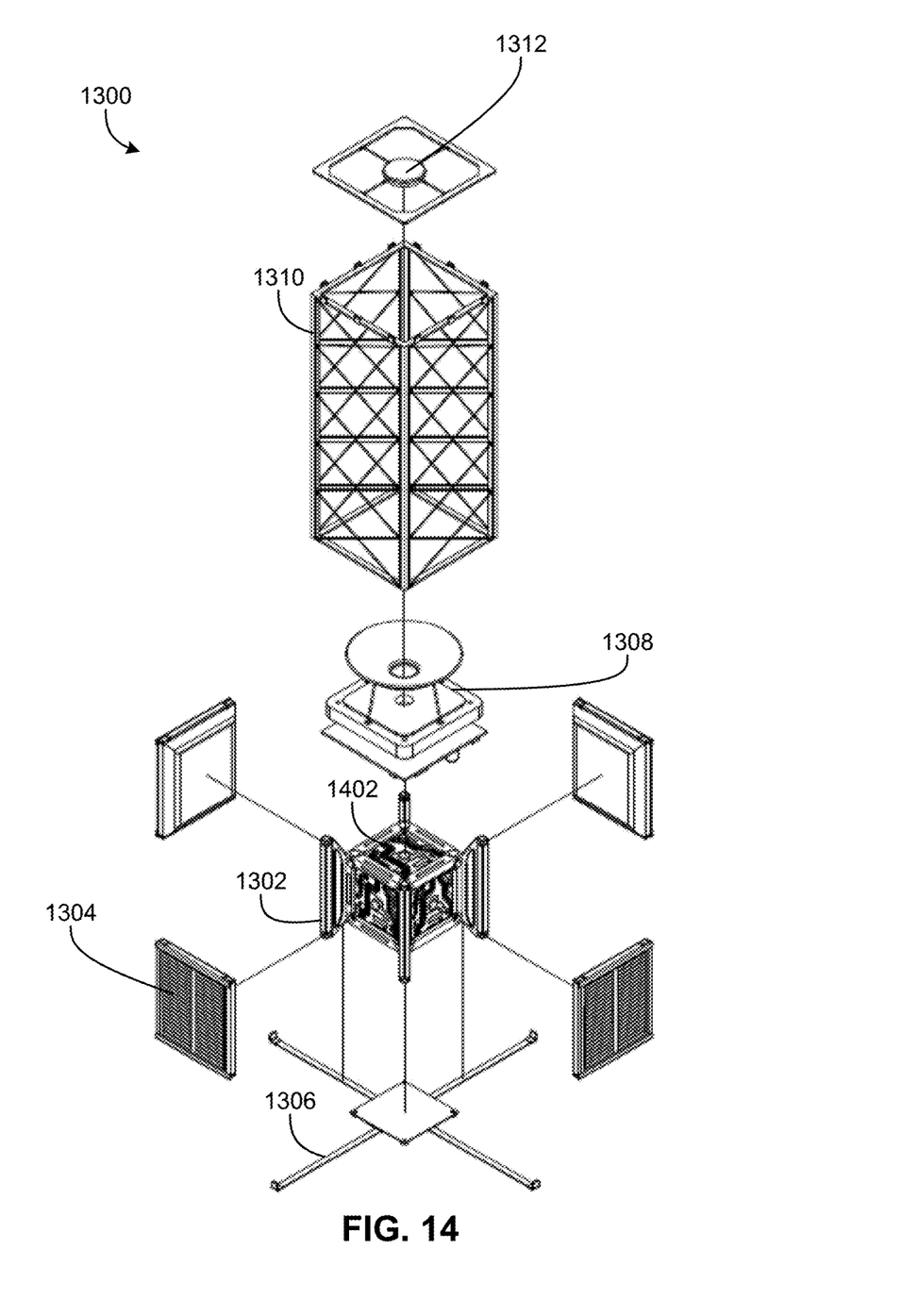
FIG. 14 is an exploded view of the observation satellite of FIG. 13.

Referring now to FIGS. 13 & 14, images of an observation satellite 1300, according to various aspects of the present disclosure, are shown.

Certain classes of space-based telescopes require a reflector to be separated from the focal point and/or image collector (e.g., a CCD camera). Many portions of such telescopes, such as electronics, lenses, reflectors and the like have geometries which readily withstand launch forces. Structures which position the reflector away from the image collector, on the other hand, are typically extended structures which may unnecessarily take up volume and/or must be "overbuilt" to withstand launch forces. Satellite 1300 includes several components which may be manufactured in space using additive manufacturing device 200 deployed in a spacecraft, on a space station, in space or the like. This allows components of satellite 1300 to be launched into space in a more compact form and for the interconnecting structure and extended structures to be produced in space, saving mass and allowing satellite 1300 to be designed in a manner optimized for space operations, rather than both space operations and launch survivability.

Observation satellite 1300 may be configured to satisfy 3 unit CubeSat size requirements and include a 1U CubeSat having a frame 1302, internal electronics 1402, four solar panels 1304, an antenna 1306 and a camera 1308. Frame 1302 may be produced in an extraterrestrial environment via device 200. In some aspects, all or portions of solar panels 1304, antenna 1306 and camera 1308 may be produced in the extraterrestrial environment via device 200. A reflector support structure 1310 housing a reflector 1312 positioned opposite camera 1308 is attached to frame 1302. Reflector support structure 1310 may be created by device 200 and optimized to support reflector 1312 in a microgravity environment.

Figure 15:
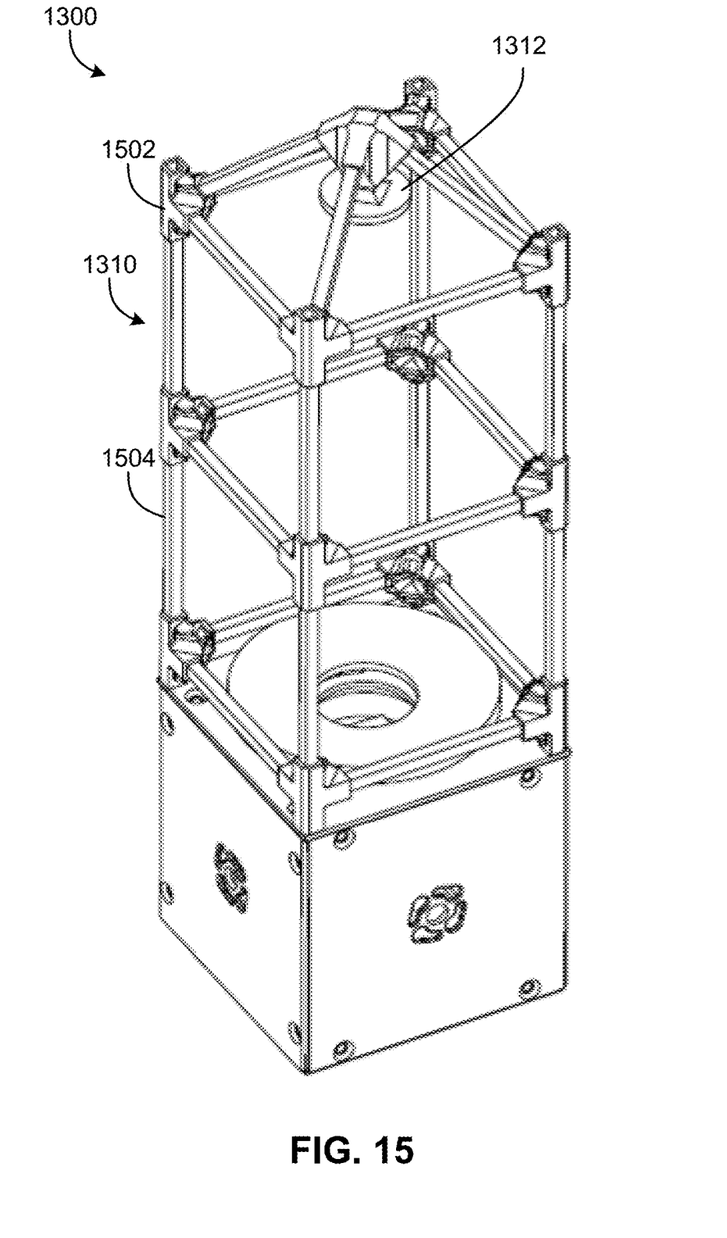
FIG. 15 is a perspective view of observation satellite having a support structure assembled from multiple additively manufactured joints and trusses, according to an aspect of the present disclosure FIGS. 16A & B are images of a support apparatus for multiple microsatellites, according to an aspect of the present disclosure.

Referring now to FIG. 15, a perspective view of observation satellite having support structure 1310 assembled from multiple additively manufactured joints 1502 and trusses 1504, according to an aspect of the present disclosure, is shown.

Device 200 may be used to produce a plurality of trusses 1504 and joints 1502, allowing the rapid assembly of reflector support structure 1310 without tools. In various aspects, trusses 1504 and joints 1502 may have a construction which would not survive a rocket launch. Observation satellite 1300 may be assembled from modular components and various printed parts such as trusses 1504 and joints 1502.

Figure 16A:
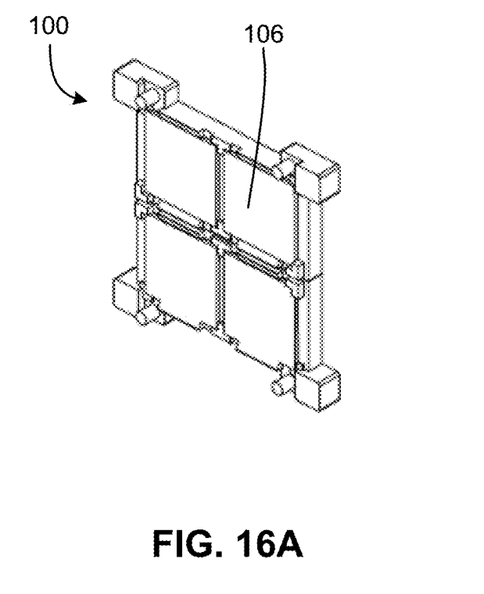
Figure 16B:
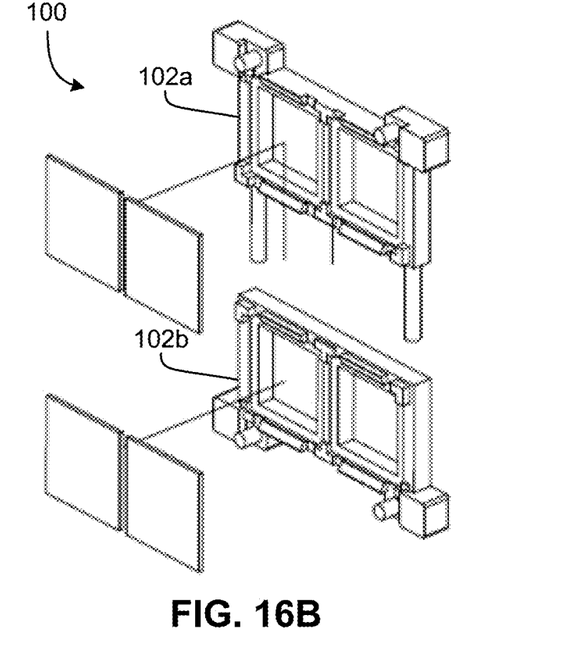
Figure 17A:
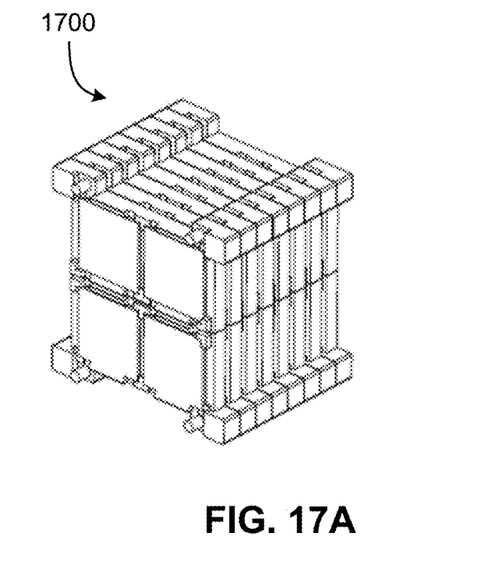
FIGS. 17A & B are images of multiple support, each containing four microsatellites, stacked for launching from a small satellite launcher, according to an aspect of the present disclosure.
Figure 17B:
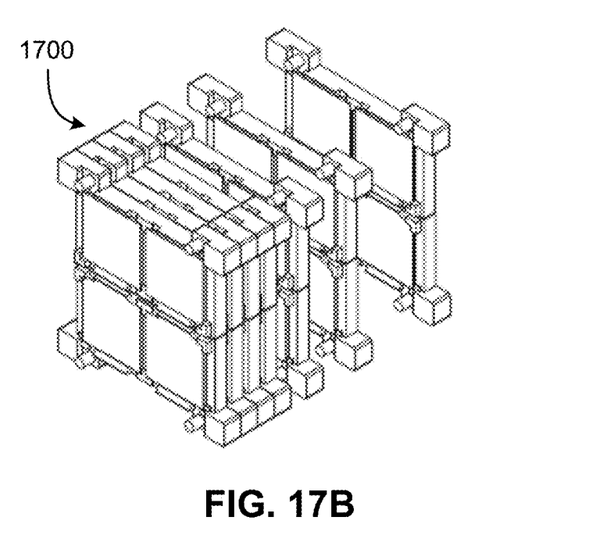

Referring now to FIGS. 16 & 17, various views of components of a stack 1700 of support apparatus 100 containing multiple electronics boards 106 or microsatellites, according to various aspects of the present disclosure, are shown.

A single support apparatus 100 maybe configured to contain four or more functional components, such as four microsatellites 106 shown in FIG. 15A. As shown in FIG. 15B, support apparatus 100 may be constructed via additive manufacturing in multiple parts which interlock. Multiple apparatus may be grouped together forming a stack 1700, allowing many microsatellites to be deployed from a single satellite launcher.

While various aspects of the present disclosure have been described herein, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures. As will be appreciated by those skilled in the relevant art(s) after reading the description herein, certain features from different aspects of the systems, apparatus and methods of the present disclosure may be combined to form yet new aspects of the present disclosure.

What is claimed is:

1. A method of manufacturing a space device in an extraterrestrial environment, the method comprising:
   providing at least one prefabricated component to an extraterrestrial environment build site;
   constructing, via an additive manufacturing device at the extraterrestrial environment build site, at least one manufactured element of the space device;
   assembling a complete space device from the at least one prefabricated component and the at least one manufactured element wherein at least a part of the space device made of shape memory materials has at least one dimension of the space device at a reduced thickness that is required for the space device; and
   exposing the complete space device to a stimulus to cause at least the part of the space device having at least one dimension at the reduced thickness to expand to its full size three dimensional shape,
   wherein at least one of the at least one prefabricated component and the at least one manufactured element comprise the shape memory materials.

2. The method of claim 1, further comprising:
   deploying the complete space device into the extraterrestrial environment via a small satellite launcher.

3. The method of claim 1, step of providing at least one prefabricated component further comprising:
   providing, via space launch, additive manufacturing device feedstock to the extraterrestrial environment build site;
   wherein the additive manufacturing device feedstock was manufactured on Earth.

4. The method of claim 3, wherein the additive manufacturing device feedstock is one of: a thermoplastic; a metal; a shape memory material; and a composite material.

5. The method of claim 1, wherein the at least one prefabricated component is at least one of: a circuit board; a satellite on a chip; an electrical component; and a structure connector.

6. The method of claim 1, wherein the at least one manufactured element provides more than fifty percent of all structural support of the complete space device.

7. The method of claim 6, wherein the structural support of the complete space device is insufficient to withstand rocket launch forces.

8. The method of claim 7, wherein the complete space device is one of: a satellite; a satellite component; a spacecraft; and a space habitat.

9. The method of claim 1, wherein the extraterrestrial environment is space and the extraterrestrial environment build site is one of: a spacecraft; and a space habitat.

10. The method of claim 1, wherein:
    the additive manufacturing device is configured to construct multi-material objects; and
    the at least one manufactured element comprises an electrical structure configured to connect to the at least one prefabricated component.

11. The method of claim 1, further comprising manufacturing the at least one prefabricated component with a second additive manufacturing device at a location other than the extraterrestrial environment build site with the memory shape materials.

* * * * *